United States Patent [19]

Alfenaar

[11] Patent Number: 4,576,877
[45] Date of Patent: Mar. 18, 1986

[54] FUEL CELL

[75] Inventor: Marinus Alfenaar, Schinnen, Netherlands

[73] Assignee: Electrochemische Energieconversie N.V., Mol, Belgium

[21] Appl. No.: 690,621

[22] Filed: Jan. 11, 1985

[30] Foreign Application Priority Data

Jan. 14, 1984 [NL] Netherlands .................. 8400127

[51] Int. Cl.$^4$ ................ H01M 8/02; H01M 8/18
[52] U.S. Cl. ................................ 429/12; 429/21; 429/52
[58] Field of Search ............... 429/12, 13, 14, 15, 429/16, 17, 18, 19, 48, 21, 22, 52, 34

[56] References Cited

U.S. PATENT DOCUMENTS

| 3,395,045 | 7/1968 | Ruetschi | 429/13 |
| 3,791,870 | 2/1974 | Grune | 136/86 E |
| 4,233,371 | 11/1980 | Dorrestijn | 429/152 |

Primary Examiner—Donald L. Walton
Attorney, Agent, or Firm—Cushman, Darby & Cushman

[57] ABSTRACT

Present invention relates to a fuel cell consisting of at least an anode and a cathode, in which fuel cell the anode is connected with the cathode within this fuel cell through one or more electrical conductors, and the arithmetic product of the total electrical resistance between the anode and the cathode electrically conductive conductor(s) therewith within the fuel cell in $\Omega$ and the active area of the cathode in $m^2$ lies between $10^{-4}$ and $10\ \Omega m^2$.

11 Claims, 2 Drawing Figures

FUEL CELL

FIELD OF THE INVENTION

The present invention relates to a fuel cell consisting of at least an anode and a cathode. More particularly, the invention relates to a fuel cell wherein the anode is connected with the cathode within the fuel cell through one or more electrical conductors.

A fuel cell according to the present invention will exhibit an internal leakage current during operation. This has hitherto been regarded as a major disadvantage inasmuch as the efficiency of power generation is adversely affected by this internal leakage current.

BACKGROUND OF THE INVENTION

Known fuel cells are designed to prevent internal leakage currents during operation. The known cells are designed so that the anode and the cathode within the same cells are insulated from one another by materials with a volume-resistivity of $10^{10}$–$10^{10}$ Ω cm and above. Examples of such fuel cells are given in the Canadian Pat. No. 867,991, in Canadian Pat. No. 1,129,946, in U.S. Pat. No. 4,048,386 and in U.S. Pat. No. 4,233,371. In the handbook by Y. Breelle and others, Principes technologie and applications de piles a combustible, Institut Francais du Petrole, Paris (1972), it is emphatically recommended on page 41 to thoroughly insulate the electrodes from one another within the fuel cell.

The known state of the art is thus strongly biased against the novel fuel cell according to the invention, in which the electrical resistance between the anode and the cathode within this fuel cell has been reduced relative to the prior art rather than, as would be obvious, to increase this electrical resistance in order to achieve a still further increased insulation between the relative anode and cathode.

SUMMARY OF THE INVENTION

The present invention relates to a fuel cell to supply current to an apparatus. The fuel cell consists of at least an anode and a cathode. More particularly, the anode is connected with the cathode within the fuel cell through one or more electrical conductors. The arithmetic product of the total electrical resistance between the anode the cathode which are electrically conductively connected together within the fuel cell in Ω in the active area the cathode ranges between $10^{-4}$ and 10 Ωm².

The advantage of the new fuel cell according to the invention is the much better stability in time in comparison with otherwise identical fuel cells having a large electrical resistance between the anode and the cathode within the cell.

DETAILED DESCRIPTION OF THE INVENTION

Figure 1:
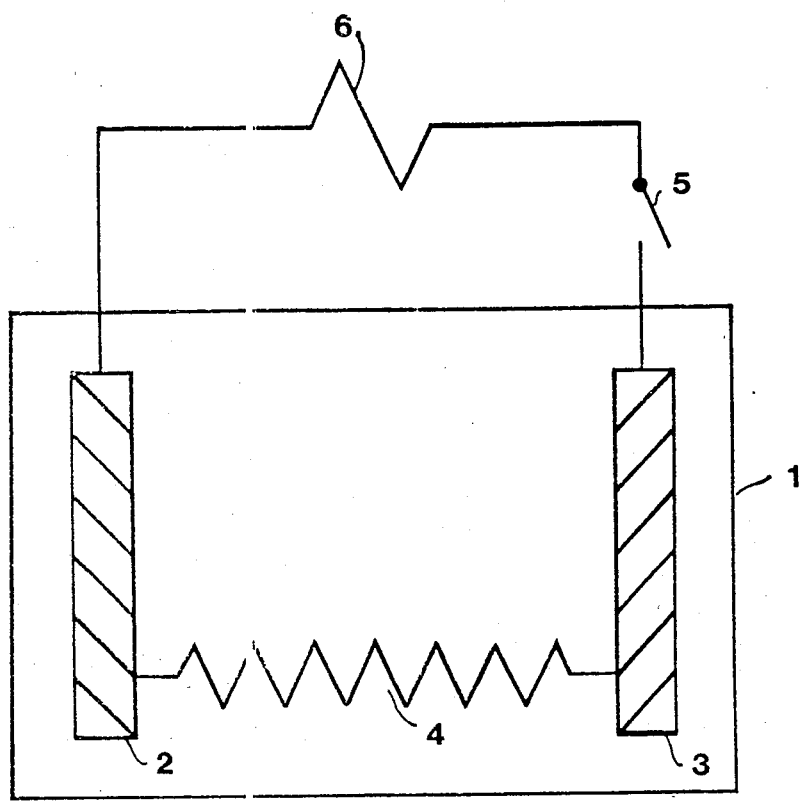
FIG. 1 illustrates a fuel cell of the present invention.

The present invention relates to a fuel cell wherein the fuel cell 1 consists of at least an anode 3 and a cathode 3 in the fuel cell 1 such that anode 2 is electrically conductively connected, internally within the fuel cell, to the cathode 3 through at least one electrical conductor 4. The arithmetic product of the total electrical resistance between the anode 2 and the cathode 3 electrically conductively connected together within fuel cell 1, in Ω and the active area of the cathode being measured in m², ranges between $10^{-4}$ to 10 Ωm². More advantageously, the arithmetic product ranges between $10^{-3}$ Ωm² to 5 Ωm².

The (an) anode 2 may be composed of a plurality of electrically conductively interconnected part anodes.

The (a) cathode 3 may be composed of a plurality of electrically conductively interconnected part cathodes.

According to the present invention, the electrically conductive connection between the anode 2 and the cathode 3 within the fuel cell may be embodied in a variety of fashions. Suitable embodiments are a spacer of sufficiently electrically conductive material between anode and cathode, one or more electrically conductive wires between anode and cathode, and a plurality of contact points between anode and cathode, preferably distributed on the surface.

Advantageously, the most suitable embodiment is one in which the electrodes are embedded in a frame consisting of a sufficiently electrically conductive material. The electrodes are preferably flat electrodes. The frame is preferably an electrically conductive plastic. Suitable electrically conductive plastics include, for instance, plastics incorporating a suitable number of carbon particles and/or metal particles. The electrically conductive frame(s) of the anode 2 and the cathode 3 within a fuel cell 1 are electrically conductively connected with one another. The electrical connection being made, for instance, by direct contact with one another for instance through welds or through an electrically conductive bonding agent such as an epoxy glue containing metal powder. A most suitable embodiment of flat electrodes embedded in a frame consisting wholly or largely of plastic is described in the Canadian Pat. No. 1,129,946, which is referred to for a more elaborate description of such electrodes.

According to the present invention, in another very suitable embodiment, the fuel cell 1 consists at least of an anode 2 and a cathode 3 embedded and/or encapsulated in a sufficiently conductive thermosetting synthetic resin. The anode 2 and cathode 3 are, preferably, flat. For suitable methods of fabricating such fuel cells in which the electrodes are embedded in thermosetting resin, reference is made to the disclosures of U.S. Pat. Nos. 4,048,386 and No. 4,233,371.

In FIG. 1, the power from fuel cell 1 is supplied to power drain (apparatus) 6. The electrical circuit is opened or closed with switching means 5.

A fuel cell according to the invention is particularly suitable to be used as an oxygen-hydrogen cell with advantageously an alkaline electrolyte.

The invention is further elucidated with the following example and the comparative experiment.

EXAMPLE I

A battery of fuel cells is composed of 18 fuel cells, which fuel cells are electrically arranged in series in 9 parallel pairs. All fuel cells are virtually identical and consist of a flat anode with an active area of 0.03 m² and a flat cathode with an active area of 0.03 m² embedded in a frame consisting of a plastic that has been made electrically conductive by means of carbon particles. Both the anode and the cathode contain platinum on high surface area carbon as catalyst. The total electrical resistance between an anode and a cathode in each fuel cell amounts to 20–30 $\Omega$.

Figure 2:
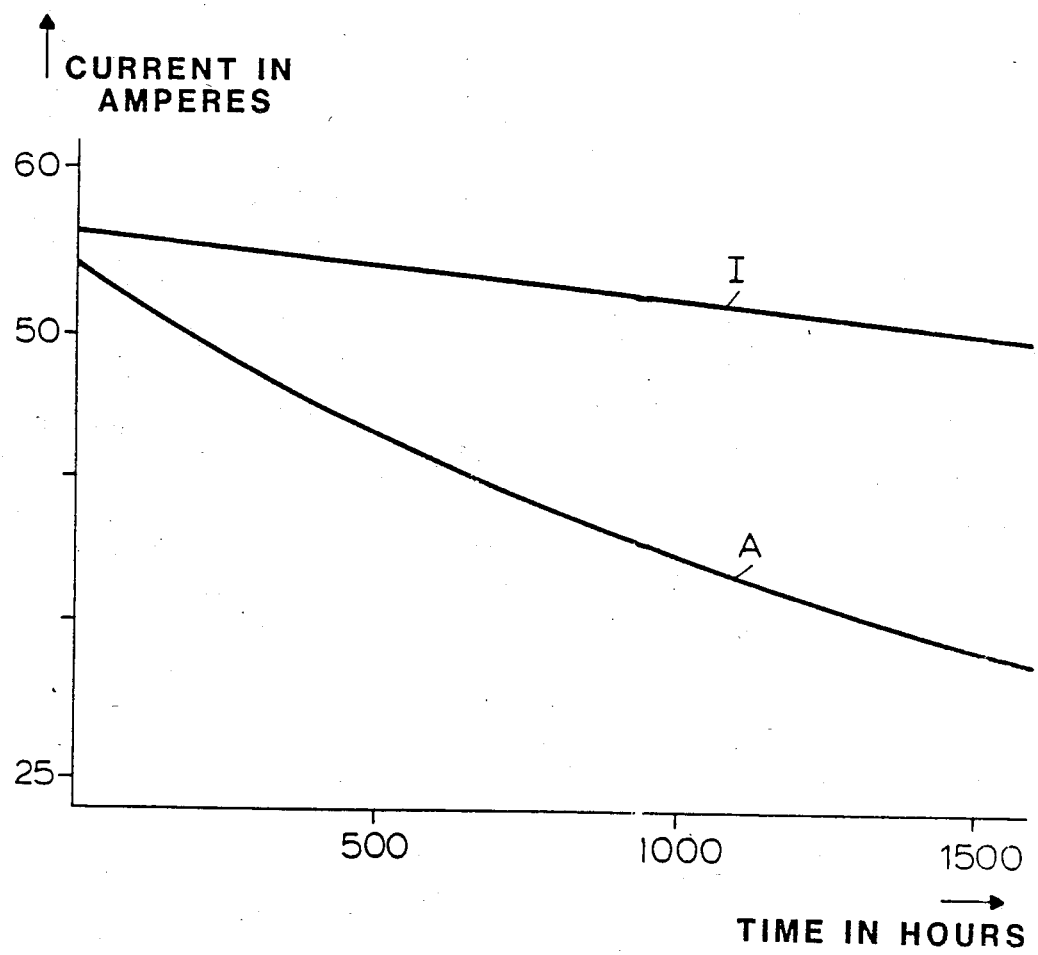
FIG. 2 graphically illustrates the results of measurements of the fuel cell current in accord with the Examples.

Every other week this battery of fuel cells is loaded for 1.5 hours at a voltage of 6 volts at 65° C., using hydrogen as fuel and oxygen in the form of air as oxidant. On each occasion the current is measured which the battery still delivers. The results of these measurements are depicted by line I in FIG. 2.

COMPARATIVE EXPERIMENT A

A battery of fuel cells is composed of 18 fuel cells, which fuel cells are electrically arranged in series in 9 parallel pairs. All fuel cells are virtually identical and consist of the same type of anode and the same type of cathode as applied in Example I, embedded in a non-conductive plastic. The total electrical resistance between an anode at a cathode in each fuel cell is in excess of $10^6$ $\Omega$.

In the same manner as in Example I this battery of fuel cells is loaded every other week for 1.5 hours at a voltage of 6 Volts at 65° C. Again, on each occasion the current is measured which the battery still delivers. The results of these measurements are depicted by line A in FIG. 2.

The tests described above demonstrate that a battery of fuel cells according to the invention exhibits a virtually constant performance for a much longer period of time than a battery of fuel cells according to the state of the art.

I claim:

1. A fuel cell comprising:
   an anode;
   a cathode; and
   at least one electrically conductive member wherein the anode is connected with the cathode within said fuel cell through at least one said electrically conductive member and
   the arithmetic product of the total electrical resistance between the anode and the cathode electrically conductive connected together within said fuel cell, measured in $\Omega$ and the active area of the cathode in m$^2$, lies between $10^{-4}$ and 10 $\Omega$m$^2$.

2. Fuel cell according to claim 1, wherein said fuel cell comprises frames of electrically conductive plastic, and an anode and a cathode, both of which are embedded in said frames of electrically conductive plastic, which frames are electrically conductively connected with one another.

3. Fuel cell according to claim 2, wherein said frames contain, as electrically conductive plastic, a plastic incorporating carbon particles, metal particles, or mixtures thereof.

4. Fuel cell according to claim 1 wherein said fuel cell further comprises an anode and a cathode embedded and/or encapsulated in a sufficiently electrically conductive thermosetting synthetic resin.

5. Fuel cell according to claim 1, wherein said anode and said cathode are flat.

6. Fuel cell according to claim 1, wherein said arithmetic product lies between $10^{-3}$ and 5 $\Omega$m$^2$.

7. Fuel cell according to claim 6, wherein said at least one electrically conductive member comprises electrically conductive plastic frames for, respectively, said anode and said cathode, said frames being electrically conductively connected together, said anode and said cathode being embedded in a respective frame.

8. Fuel cell according to claim 7, wherein said anode and said cathode are flat.

9. A battery of fuel cells containing at least one fuel cell according to claim 6, wherein said cell is an oxygen-hydrogen cell having an alkaline electrolyte.

10. Fuel cell according to claim 1, wherein said fuel cell is an oxygen-hydrogen cell having an alkaline electrolyte.

11. A battery of fuel cells containing at least one fuel cell according to claim 1.

* * * * *